United States Patent
Kraatz

(10) Patent No.: US 10,330,143 B2
(45) Date of Patent: Jun. 25, 2019

(54) SERVICEABLE JOINT WITH REMOVABLE RACE

(71) Applicant: Clayton Kraatz, Irricana (CA)

(72) Inventor: Clayton Kraatz, Irricana (CA)

(73) Assignee: Clayton Kraatz, Irricana (CA)

( * ) Notice: Subject to any disclaimer, the term of this patent is extended or adjusted under 35 U.S.C. 154(b) by 481 days.

(21) Appl. No.: 15/057,249

(22) Filed: Mar. 1, 2016

(65) Prior Publication Data

US 2016/0258481 A1 Sep. 8, 2016

Related U.S. Application Data

(60) Provisional application No. 62/128,159, filed on Mar. 4, 2015.

(51) Int. Cl.
*F16C 11/00* (2006.01)
*F16C 11/06* (2006.01)

(52) U.S. Cl.
CPC ...... *F16C 11/0695* (2013.01); *F16C 11/0628* (2013.01); *F16C 11/0642* (2013.01); *Y10T 403/32737* (2015.01); *Y10T 403/32803* (2015.01); *Y10T 403/32983* (2015.01)

(58) Field of Classification Search
CPC .............. F16C 11/0628; F16C 11/0642; F16C 11/0695; F16C 11/0647; Y10T 403/32732; Y10T 403/32803; Y10T 403/32983; Y10T 403/32737; Y10T 403/32836

See application file for complete search history.

(56) References Cited

U.S. PATENT DOCUMENTS

| | | | | | |
|---|---|---|---|---|---|
| 2,827,303 | A | * | 3/1958 | Herbenar | B60G 3/20 280/124.136 |
| 2,880,026 | A | * | 3/1959 | Moskovitz | H05B 6/642 403/132 |
| 3,210,108 | A | * | 10/1965 | Herbenar | F16C 11/04 280/93.511 |
| 3,250,555 | A | * | 5/1966 | Wehner | F16C 11/0647 384/251 |
| 3,361,459 | A | * | 1/1968 | Marquis | B62D 7/16 280/93.508 |
| 3,495,859 | A | * | 2/1970 | Morris | B62D 7/16 280/93.508 |
| 4,017,197 | A | * | 4/1977 | Farrant | B60G 7/005 403/132 |
| 4,101,227 | A | * | 7/1978 | Herbenar | B62D 7/16 403/27 |

(Continued)

*Primary Examiner* — Matthew R McMahon
(74) *Attorney, Agent, or Firm* — Kyle R Satterthwaite; Ryan W. Dupuis; Ade & Company Inc.

(57) ABSTRACT

A serviceable joint features a pin, a housing with a hollow interior, and a removable race. The race has hollow interior chambers, an upper one of which is larger than the lower. The bottom end of the pin is passable through the hollow interior chambers and onward through an open lower end of the housing to situate the top end of the joint pin within the upper chamber of the race, from which a remainder of the pin hangs in free floating state. A retaining ring is engaged in an annular groove in the peripheral wall of the housing to clamp the race in place in a seated position abutting a tapered exterior area of the race against a tapered interior portion of the housing, whereby the race is centered and stabilized in the housing to restrain the head of the free-floating pin.

2 Claims, 3 Drawing Sheets

(56) References Cited

U.S. PATENT DOCUMENTS

| | | | | |
|---|---|---|---|---|
| 4,111,571 A * | 9/1978 | Farrant | ............... | B60G 7/005 116/208 |
| 4,187,033 A * | 2/1980 | Zukowski | ............... | B62D 7/18 403/137 |
| 4,203,683 A * | 5/1980 | Rogers | ............... | F16C 11/0633 403/132 |
| 5,529,420 A * | 6/1996 | Henkel | ............... | B62D 7/16 403/120 |
| 5,607,249 A * | 3/1997 | Maughan | ............... | B62D 7/16 403/120 |
| 6,146,045 A * | 11/2000 | Maughan | ............... | F16D 1/12 280/93.508 |
| 6,371,682 B1 * | 4/2002 | Maughan | ............... | B62D 7/16 280/93.508 |
| 6,439,794 B2 * | 8/2002 | Schmidt | ............... | B62D 7/16 403/120 |
| 6,908,251 B2 * | 6/2005 | Molenaar | ............... | B60G 7/005 403/142 |
| 7,390,126 B2 * | 6/2008 | Martin | ............... | B62D 7/166 384/125 |
| 7,600,940 B1 * | 10/2009 | Byrnes | ............... | F16C 11/0623 403/131 |
| 7,841,799 B2 * | 11/2010 | Spratte | ............... | F16C 11/0604 403/122 |
| 7,927,035 B2 * | 4/2011 | Molenaar | ............... | B60G 7/001 403/126 |
| 8,256,980 B2 * | 9/2012 | Walter | ............... | F16C 11/0695 280/93.511 |
| 8,342,769 B2 * | 1/2013 | Elterman | ............... | B62D 7/166 403/136 |
| 8,747,012 B2 * | 6/2014 | Byrnes | ............... | B62D 7/166 403/122 |
| 8,967,868 B2 * | 3/2015 | Wright | ............... | F16C 11/0642 384/208 |
| 9,316,250 B2 * | 4/2016 | Elterman | ............... | F16C 11/0604 |
| 2012/0093574 A1 | 4/2012 | Carli | | |
| 2012/0282014 A1 * | 11/2012 | Ersoy | ............... | B60G 7/005 403/122 |
| 2013/0114996 A1 * | 5/2013 | Kraatz | ............... | F16C 11/0642 403/143 |
| 2014/0086667 A1 * | 3/2014 | Elterman | ............... | F16C 11/0633 403/122 |

* cited by examiner

US 10,330,143 B2

SERVICEABLE JOINT WITH REMOVABLE RACE

CROSS REFERENCE TO RELATED APPLICATIONS

This application claims benefit under 35 U.S.C. 119(e) of Provisional Application Ser. No. 62/128,159 filed Mar. 4, 2015.

FIELD OF THE INVENTION

The present invention relates generally to joints, and more particularly to joints that can be dismantled for service and repair.

BACKGROUND

Conventional ball joints are manufactured in a manner that prevents access to interior components for service of the ball joints when significantly worn after extended use due to a pressed together assembly that cannot be disassembled in a non-destructive manner.

U.S. Patent Application Publication 2012/0093574 discloses an example of a more serviceable design in which a threaded cap replaces the conventional press-fit closure of the ball joint housing. However, only the ball joint pin can be removed from the housing, which features an integrally formed race for constraining the movement of the pin. Accordingly, only the pin can be replaced once worn.

Applicant has developed a unique joint design in which race and pin are both removable from a separate housing to optimize the serviceability of the joint.

SUMMARY OF THE INVENTION

According to one aspect of the invention, there is provided a joint comprising:

a housing comprising a housing body having a hollow interior extending thereinto along a housing axis from an open upper end of said housing body toward an opposing lower end of said housing body;

a joint pin having a top end, an opposing bottom end of smaller diameter than the top end, and a longitudinal dimension spanning between the top and bottom ends, the top end of the joint pin being smaller in diameter than the hollow interior of the housing at the upper end thereof, and the bottom end of the joint pin being smaller in diameter than the hollow interior of the housing at the lower end thereof;

a race sized to seat within the hollow interior of the housing body adjacent the lower end thereof, the race having a hollow interior upper chamber opening thereinto at a proximal end of the race and a hollow interior lower chamber opening into the hollow interior upper chamber from a distal end of the race that lies opposite to the proximal end, the hollow interior upper chamber being greater diameter than the top end of the joint pin and the hollow interior lower chamber being of lesser diameter than the top end of the joint pin and greater diameter than the bottom end of the joint pin, the bottom end of the joint pin being passable through the hollow interior chambers of the race and onward through the open lower end of the housing from the upper end thereof to situate the top end of the joint pin within the hollow interior upper chamber;

an annular groove in a peripheral wall of the hollow interior of the housing body at a position that is adjacent to the top end of the race when said race is seated in the housing body; and a retaining ring engagable in the annular groove around the peripheral wall of the hollow interior of the housing body to reside between upper and lower walls of the annular groove at a position between the proximal end of the race and the upper wall of the annular groove, which is located between the retaining ring and the open upper end of the housing and blocks movement of the retaining ring toward the open upper end of the housing.

Preferably the hollow interior of the housing is greater in diameter at the upper end thereof than at the lower end thereof and the peripheral wall of the hollow interior of the housing body comprises a tapered portion which narrows in diameter moving toward the lower end of the housing, and an exterior of the race is greater in diameter at the proximal end thereof than at the distal end thereof and comprises a tapered area that narrows in diameter toward the distal end of the race at an angle of taper that matches the tapered portion of the peripheral wall of the hollow interior of the housing body for seating of the tapered area of the race against the tapered portion of the housing.

Preferably the upper end of the housing comprises internal threading, and the joint further comprises an externally threaded retaining member arranged to threadingly engage the internal threading at the upper end of the housing body, the annular groove in the peripheral wall of the hollow interior of the housing body being disposed between the internal threading of the housing and the lower end of the housing for clamping of the retaining ring against the proximal end of the race by the retaining member under threaded advancement of the retaining member.

In the assembled joint, preferably the interior space of the housing is free of any other components between the annular groove and the internally threaded upper end of the housing such that the retaining member, the retaining ring and the annular groove alone define an only mechanism of the joint for blocking movement of the race toward and through the open, internally threaded, upper end of the housing.

According to a second aspect of the invention, there is provided a joint comprising:

a housing comprising a housing body having a hollow interior extending thereinto along a housing axis from an open upper end of said housing body toward an opposing open lower end of said housing body;

a joint pin having a top end, an opposing bottom end of smaller diameter than the top end, and a longitudinal dimension spanning between the top and bottom ends, the top end of the joint pin being smaller in diameter than the hollow interior of the housing at the upper end thereof, and the bottom end of the joint pin being smaller in diameter than the hollow interior of the housing at the lower end thereof;

a race seated within the hollow interior of the housing body adjacent the lower end thereof, the race having a hollow interior upper chamber opening thereinto at a proximal end of the race and a hollow interior lower chamber extending from the hollow interior upper chamber to a distal end of the race that lies opposite to the proximal end, the top end of the joint pin residing within the hollow interior upper chamber of the race, from which joint pin hangs downward from the hollow interior upper chamber through the hollow interior lower chamber and the open lower end of the housing;

an annular groove in a peripheral wall of the hollow interior of the housing body at a position that is adjacent to the top end of the race when said race is seated in the housing body; and a retaining ring engaged in the annular groove around the peripheral wall of the hollow interior of the housing body and residing between upper and lower walls of the annular groove at a position between the proximal end of the race and the upper wall of the annular groove, which is located between the retaining ring and the open upper end of the housing and blocks movement of the retaining ring toward the open upper end of the housing.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
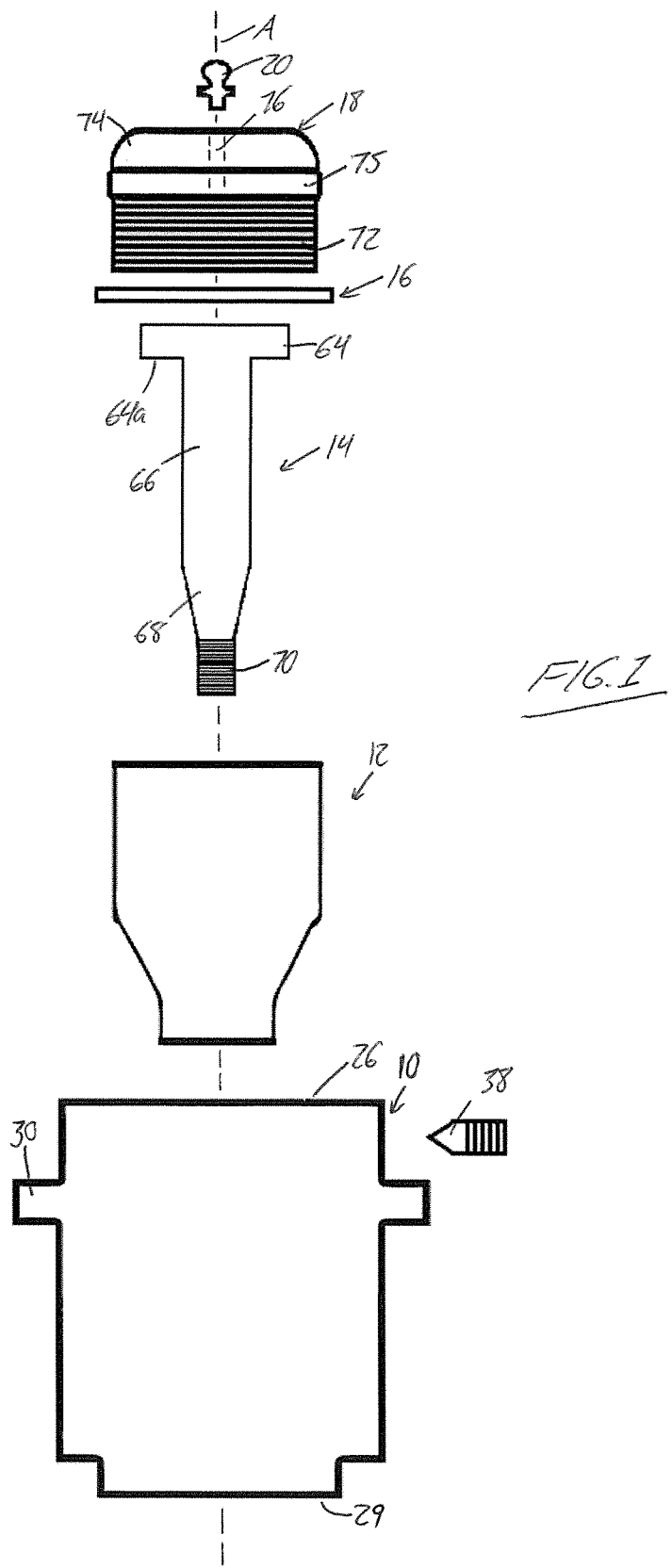
FIG. 1 is an exploded elevational view of a joint according to the present invention.
Figure 2:
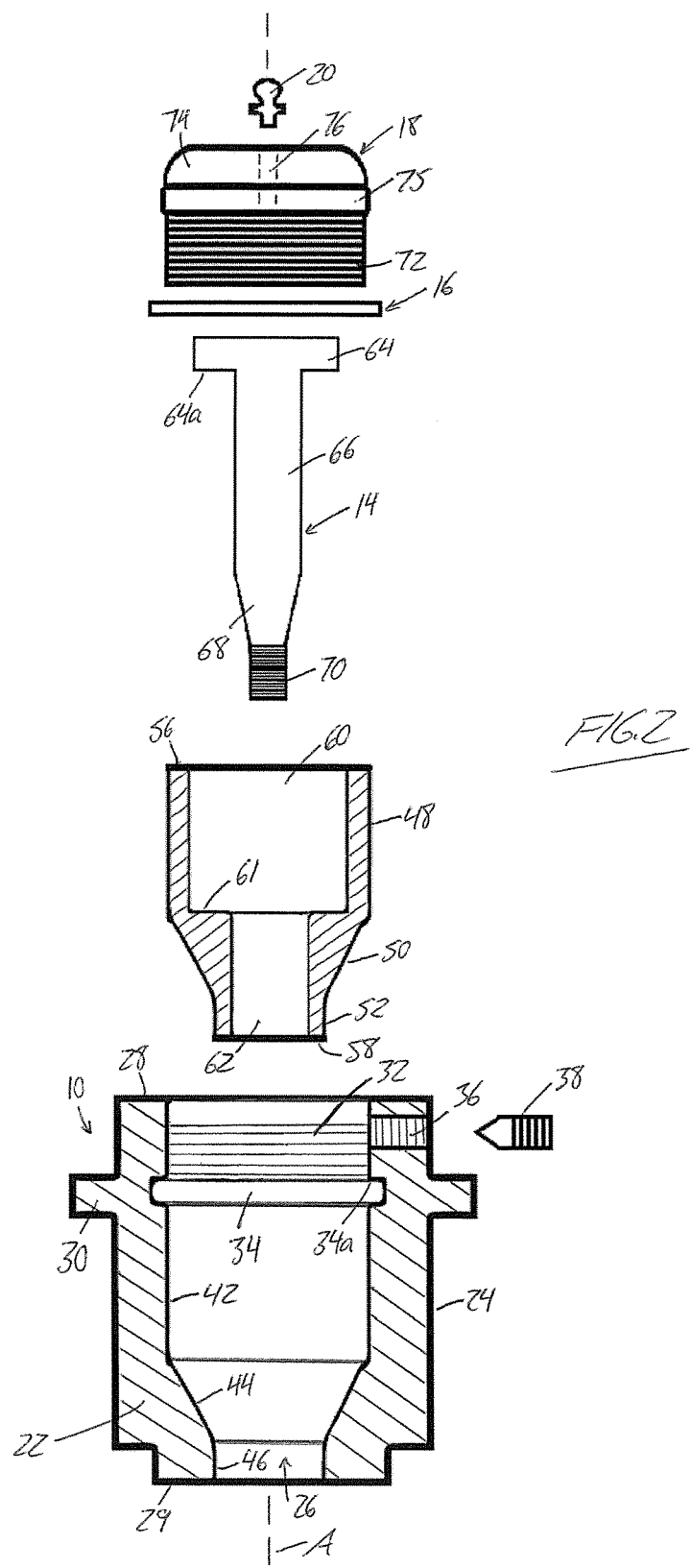
FIG. 2 is a partially cross-sectioned view of the exploded joint of FIG. 1.
Figure 3:
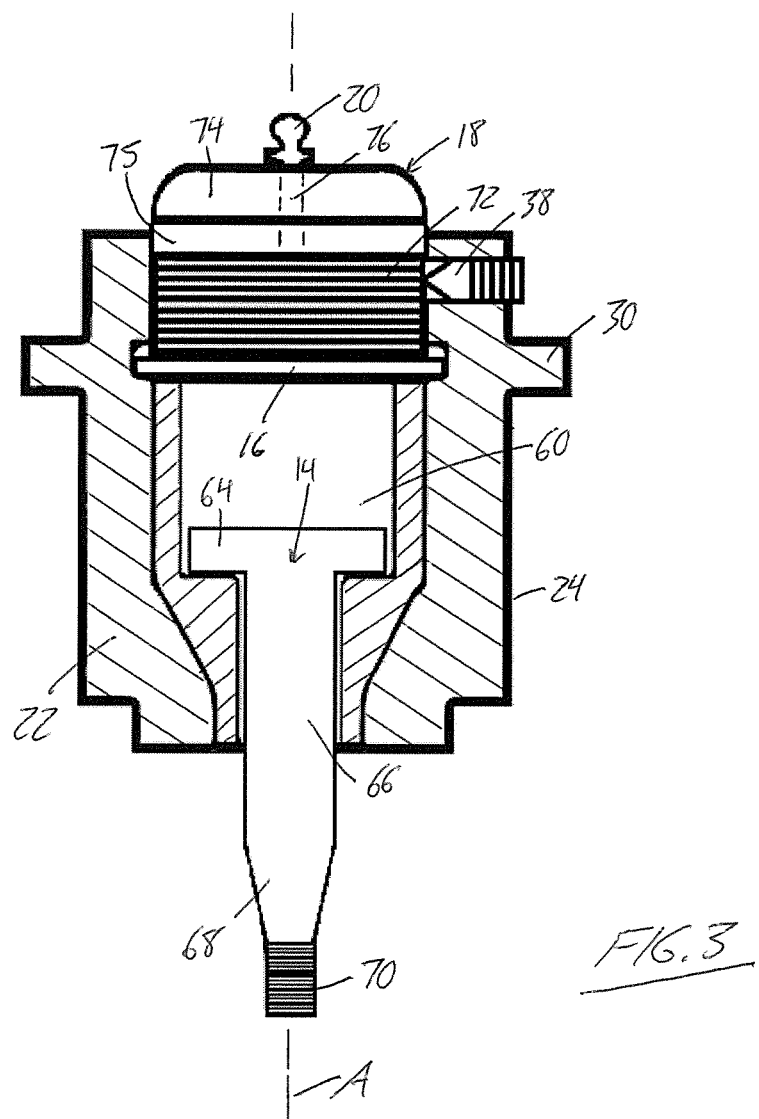
FIG. 3 is a partially cross-sectioned view of the joint of FIG. 1 in a fully assembled state.

FIG. 1 illustrates the components of a joint of present invention, which is assembled from a housing 10, a single piece race 12, a pin member 14, a retaining ring 16, a retaining cap 18 and a grease fitting 20. In one embodiment, the race, housing and pin are all preferably made of steel, for example 4140 HTSR (heat treated, stress relieved) steel.

The housing features a housing body 22 having a circumferential exterior surface 24 that is cylindrically shaped over a substantial majority of its axial length, as measured along a longitudinal axis A of a through-bore 26 that extends through the body 22 from an upper planar end face 28 to an opposing and parallel lower planar end face 29. The housing may additionally feature an external annular flange 30 projecting outward therefrom in a radial direction relative to the through-bore axis of the body 22.

The body 22 is internally threaded at the upper end 28 of the housing body to define internal threads 32 on a cylindrical upper portion 42 of the peripheral wall of the through-bore 26. At a location slightly further into the body 22 past the inner end of the threaded portion 32 is an annular groove 34 recessed into this cylindrical peripheral wall portion 42 of the through-bore 26. A threaded bore 36 extends radially through the wall of the body 22 from the exterior surface 24 into the through-bore 26 on one side thereof at the threaded upper portion 32 thereof for receipt of a set-screw 38 of corresponding external thread.

Closer to the lower end of the body, a frustoconically tapered portion 44 of the through-bore's peripheral wall extends from the bottom end of the cylindrical portion 42 and grows narrower moving toward the lower end 29 of the housing. As a result, the opening at the lower end of the body 22 is reduced in diameter compared to the opening at the upper end 28. This tapered portion 44 presents an angled shoulder or ledge inside the through-bore of the housing near the bottom end thereof. Beneath the tapered portion 44, another cylindrical portion 46 of smaller diameter and lesser axial length than the upper cylindrical portion 42 continues downwardly to the bottom end of the housing.

Turning from the housing 10 to the race 12, the exterior periphery of the race features a cylindrical upper area 48, a tapered intermediate area 50, and a cylindrical lower area 52. The tapered area 48 has the same angle of taper as the tapered portion 44 of the housing's internal bore 26, and therefore grows narrower toward a bottom or distal end 58 of the race 12 that is located opposite to a top or proximal end 56 of the race along a central longitudinal axis of the race, which is coincident with the central longitudinal axes of all the other components of the joint in the assembled sate of the joint. The upper cylindrical area 48 of the race's exterior periphery is slightly lesser in diameter than the cylindrical upper portion 42 of the housing interior, and has an axial length less than same. The cylindrical lower area 52 of the race 12 is likewise slightly lesser than the cylindrical lower portion 46 of the housing interior in diameter, and may be equal to or lesser than same in axial length so as not to extend out of the open bottom end 29 of the housing 10 in the assembled state of the joint. The tapered area 50 of the race matches the tapered portion 44 of the housing in axial length.

The race 12 features a hollow interior passing fully through race in the axial direction. The race's hollow interior has a cylindrical upper chamber 60 that opens into the housing from the proximal upper end 56 thereof, and a cylindrical lower chamber 62 of smaller diameter than the upper chamber. The lower chamber 62 joins the bottom end of the upper chamber to the lower distal end 58 of the race.

The pin 14 is a tapered pin, featuring an enlarged circular head 64 at its top end that forms the greatest diameter portion of the overall pin, a cylindrical upper stem section 66 that extends concentrically from the head 64 on a central longitudinal axis of the pin, and a tapered intermediate stem section 68 that extends longitudinally from the cylindrical upper stem section 66 and narrows in diameter as it does so. At the narrow end of the tapered stem section 64, a final threaded stem section 70 completes the pin structure at the bottom end thereof. The head 60 of the pin 14 is of slightly lesser diameter (for example, 0.002-inches smaller) than the upper chamber 60 of the race, and the cylindrical upper stem section 66 of the pin is likewise of slightly lesser diameter (for example, 0.002-inches smaller) than the lower chamber 62 of the race. The diameter of the pin head 60 exceeds the diameter of the lower chamber of the race.

The retaining cap 18 comprises an externally threaded cylindrical body 72 on which the external threads are configured for mating engagement with the internal threads 32 of the housing to close off the opening of the through-bore 26 at the upper end 28 of the housing body 22. Atop the externally threaded cylindrical body 22 is disposed a head portion 74, on which there may be a pair of opposing wrench flats for engagement by a wrench to drive rotation of the threaded cylindrical portion 64 about its central axis. Alternatively, axial holes in the top end of the cap may be cooperable with a spanner wrench to drive rotation of the cap. A grease port 76 extends axially through the center of the cap, and receives grease fitting 20 to allow greasing of the joint subsequent to assembly. Alternatively, the grease port may extend through the cap at another position or in another direction to enable greasing of the assembled joint.

To assemble the joint, first the race 12 is inserted into the interior of the housing through the open upper end 28 thereof, and forced downwardly into a seated position abutting the tapered area 50 of the race's exterior against the tapered portion 44 of the housing 22, thereby defining an installed position of the race in which the cylindrical upper area 48 thereof resides in the cylindrical upper portion 42 of the housing at a position below the annular groove 34, and the cylindrical lower area 52 of the race 12 likewise resides in the cylindrical lower portion 46 of the housing above the bottom end 29 thereof. The threaded bottom section 70 of the pin 14 is inserted downwardly into the interior space of the housing through the open upper end 28 thereof, and onward through the upper and lower chambers 60, 62 of the race so as to pass through the open lower end 28 of the housing. The pin 14 is left in a free-floating position in which the head 64 resides in the upper chamber 60 of the race, and the stem sections 66, 68, 70 of the pin hang downwardly therefrom. The pin is prevented from falling through the bottom chamber by cooperation between the overhanging shoulder 64*a* created by the enlarged head of the pin, and the interior ledge 61 jutting inwardly from the cylindrical wall of the race's upper chamber 61, as created by the radial difference between the two chambers 60, 62.

The annular groove 34 inside the housing body 22 has a thickness (measured along the longitudinal axis of the joint) which exceeds that which is necessary to allow receipt of the retaining ring 16 therein. The position of the groove in the housing is such that this thickness of the groove 34 spans across the axial position in the through bore 26 that is occupied by the flat upper end 56 of the seated race 12. That is, an upper portion of the groove 34, having sufficient thickness to receive the ring, lies above the race 12, and a remaining lower portion of the groove lies below the upper end 56 of the race.

With the race 12 and pin 14 installed, the retaining ring 16 is engaged into the upper portion of the groove 34 so that the inner portion of the retaining ring 16 jutting into the through-bore of the housing from the groove 34 lies over the upper proximal end 56 of the race 12. Contact of the upper face of the retaining ring 16 against the upper wall 34*a* of the groove 34 thus blocks movement of the retaining ring 16 (and the race 12 therebelow) toward the upper end 28 of the housing body 22.

The retaining cap 18 is then threaded into the upper end of the housing through-bore 26 in order to close this end of the housing body and abut the flat bottom end of the cap's cylindrical portion 72 against the top face of the retaining ring 16. The retaining cap 18 is advanced further into the housing by an amount sufficient to force the retaining ring 16 downward against the race in order to clamp the race tightly against the surrounding housing at the angled interface between the tapered areas 44, 50 of the race and housing. With the retaining cap 18 advanced to this position, it is then secured in place by tightening of the set screw 38 so as to abut the pointed inner working end of the set screw radially against the exterior of the cap 18, thereby completing the assembly of the joint. In other embodiments, the retaining cap may be sufficient retained to the housing by its threaded engagement therewith, and so the set screw 38 and corresponding bore 36 may be omitted in other embodiments. As shown, an o-ring 75 or other annular seal may be secured around the head portion 74 of the cap in a circumferential recess thereof to provide a fluid-tight seal between the retaining cap and the housing at or near the upper end 28 thereof.

In the assembled joint, the interior space of the housing is free of any other component between the annular groove and the internally threaded upper end of the housing such that the retaining member, the retaining ring and the annular groove alone define an only mechanism of the joint for blocking movement of the race toward and through the open, internally threaded, upper end of the housing. The use of only a single-piece race means that there is no race putting pressure on the pin to hold it in place. The head of the pin is free floating inside the upper chamber 60 of the race, but restrained in movement and stabilized by the race.

The cooperating tapers between the race and the surrounding housing keep the race centered and stationary within the housing under the clamping action exerted on the race by the retaining ring and cap. The design thus provides a robust durable joint when assembled, yet can be easily disassembled to separate to both the pin and the race from the housing to allow replacement of either, or both, of these components without requiring a new housing, thereby providing a high degree of serviceability and repairability. The housing can be repeatedly re-used, requiring periodic replacement of only the wearing parts of the joint. Disassembly of the joint for service or repair requires only unthreading of the cap of the housing and removal of the retaining ring, which releases the clamped condition of the race, which can then be easily slid from the housing through the open top end thereof.

It will be appreciated that the terms top, bottom, upper and lower are used herein with reference to the joint orientation illustrated in the drawings for the purpose of establish directional references for use in describing relative positions of components and features of the joint, and are not intended to denote that a joint must occupy a particular position or orientation in order to read on the appended claims.

Since various modifications can be made in my invention as herein above described, and many apparently widely different embodiments of same made within the scope of the claims without departure from such scope, it is intended that all matter contained in the accompanying specification shall be interpreted as illustrative only and not in a limiting sense.

The invention claimed is:

1. A joint comprising:
  a housing comprising a housing body having a hollow interior extending thereinto along a housing axis from an open upper end of said housing body toward an opposing lower end of said housing body;
  a pin having an enlarged head at a top end thereof, an opposing bottom end of smaller diameter than the top end, and a longitudinal dimension spanning between the top and bottom ends, the top end of the pin being smaller in diameter than the hollow interior of the housing at the upper end thereof, and the bottom end of the pin being smaller in diameter than the hollow interior of the housing at the lower end thereof;
  a singular and only race of the joint, said race being sized to seat within the hollow interior of the housing body adjacent the lower end thereof, the race having a hollow interior upper chamber opening thereinto at a proximal end of the race, a hollow interior lower chamber opening into the hollow interior upper chamber from a distal end of the race that lies opposite to the proximal end, and an inwardly jutting ledge defined where the hollow interior chambers meet due to a difference in radial measure of said hollow interior chambers, the hollow interior upper chamber being of greater diameter than the enlarged head of the pin and the hollow interior lower chamber being of lesser diameter than the enlarged head of the pin and greater diameter than the bottom end of the pin, the bottom end of the pin being passable through the hollow interior chambers of the race and onward through the lower end of the housing from the upper end thereof to situate the enlarged head of the pin within the hollow interior upper chamber;
  an annular groove in a peripheral wall of the hollow interior of the housing body at a position that is adjacent to the proximal end of the race when said race is seated in the housing body; and
  a retaining ring removably engagable in the annular groove around the peripheral wall of the hollow interior of the housing body to reside between upper and lower walls of the annular groove at a position between the proximal end of the race and the upper wall of the annular groove, wherein the upper end of the housing comprises internal threading, and the joint further comprises an externally threaded retaining member engageable with the internal threading at the upper end of the housing body and advanceable therein to a position reaching the annular groove to force the retaining ring into abutted contact against the proximal end of the race to thereby clamp said race downwardly against the housing;

wherein an axial length of the hollow interior upper chamber from the interior jutting ledge of the race to the proximal end of the race in an axial direction of the housing is more than twice an axial thickness of the enlarged head of the pin in said axial direction such when the enlarged head of the pin is received in the hollow interior upper chamber and is seated against the inwardly jutting ledge, an axial gap exceeding the axial thickness of the enlarged head of the pin exists between the enlarged head of the pin and the proximal end of the race to accommodate the enlarged head of the pin in free-floating condition in the hollow interior upper chamber of the race.

2. A joint comprising:

a housing comprising a housing body having a hollow interior extending thereinto along a housing axis from an open upper end of said housing body toward an opposing open lower end of said housing body;

a pin having an enlarged head at a top end thereof, an opposing bottom end of smaller diameter than the top end, and a longitudinal dimension spanning between the top and bottom ends, the top end of the pin being smaller in diameter than the hollow interior of the housing at the upper end thereof, and the bottom end of the pin being smaller in diameter than the hollow interior of the housing at the lower end thereof;

a singular and only race of said joint being seated within the hollow interior of the housing body adjacent the lower end thereof, the race having a hollow interior upper chamber opening thereinto at a proximal end of the race, a hollow interior lower chamber extending from the hollow interior upper chamber to a distal end of the race that lies opposite to the proximal end, and an inwardly jutting ledge defined where the hollow interior chambers meet due to a difference in radial measure of said hollow interior chambers, the top end of the pin residing within the hollow interior upper chamber of the race, from which the pin hangs downward from the hollow interior upper chamber through the hollow interior lower chamber and the open lower end of the housing;

an annular groove in a peripheral wall of the hollow interior of the housing body at a position that is adjacent to the proximal end of the race; and a retaining ring removably engaged in the annular groove around the peripheral wall of the hollow interior of the housing body and residing between upper and lower walls of the annular groove at a position between the proximal end of the race and the upper wall of the annular groove, which is located between the retaining ring and the open upper end of the housing and blocks movement of the retaining ring toward the open upper end of the housing;

wherein the upper end of the housing comprises internal threading, and the joint further comprises an externally threaded retaining member engaged with the internal threading at the upper end of the housing body in a position forcing the retaining ring in abutted contact against the proximal end of the race and thereby clamping said race downwardly against the housing;

wherein, between the proximal end of the race and the open upper end of the housing, the hollow interior of the housing is free of any components other than said retaining ring and said retaining member, and an axial length of the hollow interior upper chamber from the interior jutting ledge of the race to the retaining ring abutted against the proximal end of the race in an axial direction of the housing is more than twice an axial thickness of the enlarged head of the pin in said axial direction, such that when the enlarged head of the pin is seated against the inwardly jutting ledge, an axial gap exceeding the axial thickness of the enlarged head of the pin exists between the enlarged head of the pin and the retaining ring abutted against the proximal end of the race, whereby the enlarged head of the pin resides in free-floating condition inside the hollow interior upper chamber of the race.

\* \* \* \* \*